(12) United States Patent  
Bell, Jr. et al.

(10) Patent No.: US 7,205,493 B1
(45) Date of Patent: Apr. 17, 2007

(54) PRESSURE SENSITIVE HORN SWITCH

(75) Inventors: Oliver A. Bell, Jr., Aiken, SC (US); Aric Singletary, Hephzibah, GA (US); Warren Clark, Evans, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/421,890

(22) Filed: Jun. 2, 2006

(51) Int. Cl.
*H01H 3/14* (2006.01)

(52) U.S. Cl. .................... 200/86.5; 200/85 R; 200/512
(58) Field of Classification Search ............... 200/86.5, 200/85 R, 85 A, 511, 512
See application file for complete search history.

(56) References Cited

U.S. PATENT DOCUMENTS

| | | | | |
|---|---|---|---|---|
| 3,637,964 A | * | 1/1972 | Ivko | 200/86.5 |
| 4,040,050 A | * | 8/1977 | Nunn, Jr. | 340/384.4 |
| 4,267,414 A | * | 5/1981 | Brueggeman | 200/86.5 |
| 4,587,388 A | * | 5/1986 | Cavin | 200/86.5 |
| 5,296,840 A | * | 3/1994 | Gieffers | 340/474 |
| 5,461,355 A | * | 10/1995 | Schemansky et al. | 338/108 |
| 5,539,259 A | * | 7/1996 | Filion et al. | 307/10.1 |
| 6,042,142 A | * | 3/2000 | Ricks | 280/731 |
| 6,963,040 B1 | * | 11/2005 | Urman | 200/310 |

* cited by examiner

*Primary Examiner*—Michael A. Friedhofer
(74) *Attorney, Agent, or Firm*—Harness, Dickey & Pierce, P.L.C.

(57) ABSTRACT

A horn activation system for a lightweight utility vehicle can comprises a pressure sensitive horn switch (PSHS) operably connected to a horn button. The horn button is operable with the PSHS such that pressing the horn button compresses the PSHS. The horn activation system additionally can comprise an electronic switching device communicatively connected to the PSHS. The electronic switching device is responsive to a horn activation signal transmitted by the PSHS when the PSHS is compressed in response to depression of the horn button. The horn activation system further can comprise a horn configured to receive a current flow resulting from the electronic switching device closing a horn control circuit upon receipt of the horn activation signal.

22 Claims, 5 Drawing Sheets

PRESSURE SENSITIVE HORN SWITCH

FIELD

The present disclosure relates to a pressure sensitive horn switch for a vehicle.

BACKGROUND

Many known light-weight utility vehicles, such as a small cargo/maintenance vehicles, shuttle vehicles or golf cars, include a horn for producing an audible noise, sound or sequence of sounds. To activate or sound the horn, a horn switch is typically pressed. The horn switches are commonly mounted to and protrude through a vehicle floorboard behind a front wheel of the vehicle. The protrusion of such horn switches through the floorboard, leaves the horn switches vulnerable to exposure to water, rocks, dirt and other contaminates that can damage and/or destroy the horn switch.

SUMMARY

In various embodiments, a horn activation system for a lightweight utility vehicle is provided. The horn activation system can comprise a pressure sensitive horn switch (PSHS) operably connected to a horn button. The horn button is accessible and operable by an operator of the vehicle. More specifically, the horn button can be pressed and released by a vehicle operator. The horn button is operable with the PSHS such that pressing the horn button compresses the PSHS. The horn activation system additionally can comprise an electronic switching device communicatively connected to the PSHS. The electronic switching device is responsive to a horn activation signal transmitted by the PSHS when the PSHS is compressed in response to depression of the horn button. The horn activation system further can comprise a horn configured to receive a current flow resulting from the electronic switching device closing a horn control circuit upon receipt of the horn activation signal.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

The following description of various embodiments is merely exemplary in nature and is in no way intended to limit the present teachings, application, or uses.

Figure 1:
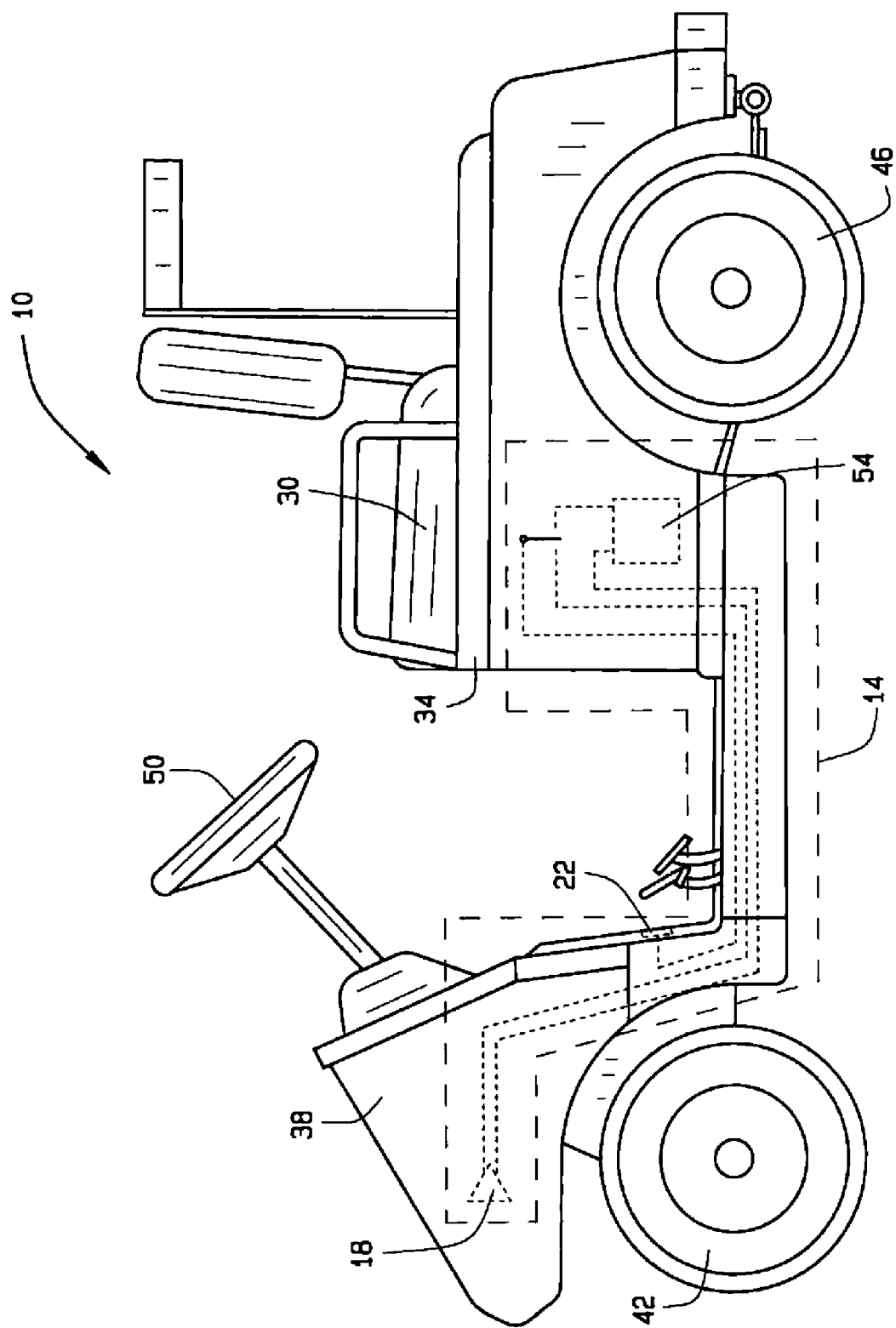
FIG. 1 is a side view of the light-weight utility vehicle including a horn activation system for controlling activation of a vehicle horn, in accordance with various embodiments of the present disclosure.

FIG. 1 illustrates a light-weight utility vehicle 10, such as a small cargo/maintenance vehicle, a shuttle vehicle or a golf car, that can comprise a horn activation system 14 for controlling the operation of a vehicle horn 18, in accordance with various embodiments of the present disclosure. The horn activation system 14 can comprise a pressure sensitive horn switch (PSHS) 22 communicatively connected to a horn control circuit 26 (shown in FIG. 2). The vehicle 10 also generally can comprise a seat assembly 30 mounted to a rear body section 34, a front body section 38 and a pair of front wheels 42 that operate to steer the vehicle 10. Additionally, the vehicle 10 can comprise a pair of rear wheels 46, wherein at least one of the rear wheels 46 functions as a drive wheel for propelling vehicle 10 and a steering wheel 50 used to control a steering angle of the front wheels 42.

Figure 2:
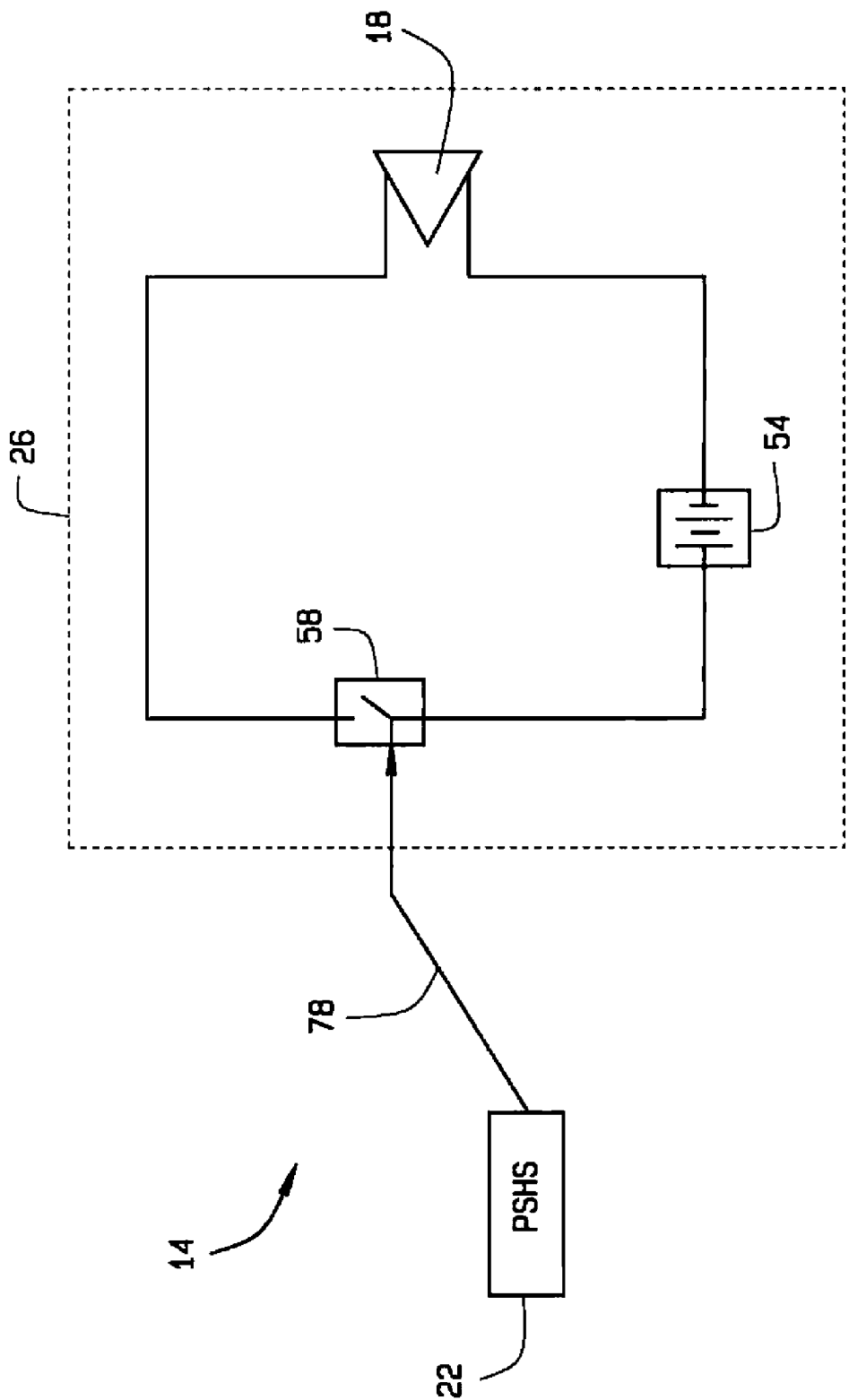
FIG. 2 is a block diagram of the horn activation system shown in FIG. 1, in accordance with various embodiments of the present disclosure.

Referring now to FIG. 2, in various embodiments, the horn control circuit 26 can comprise a power source 54, e.g., a 12V battery, that provides power, i.e., voltage across and current though the horn 18. The horn control circuit 26 also comprises an electronic switching device 58 that is communicatively connected to the pressure sensitive horn switch 22 and controls the flow of current through the horn control circuit 26. Generally, the pressure sensitive horn switch 22 is integrated with a vehicle floor assembly 62 and operably connected to a horn button 66 (shown in FIG. 3) such that depression of the horn button 66 closes the pressure sensitive horn switch 22. The floor assembly is generally shown in FIG. 1 and more particularly illustrated in FIG. 3.

Figure 3:
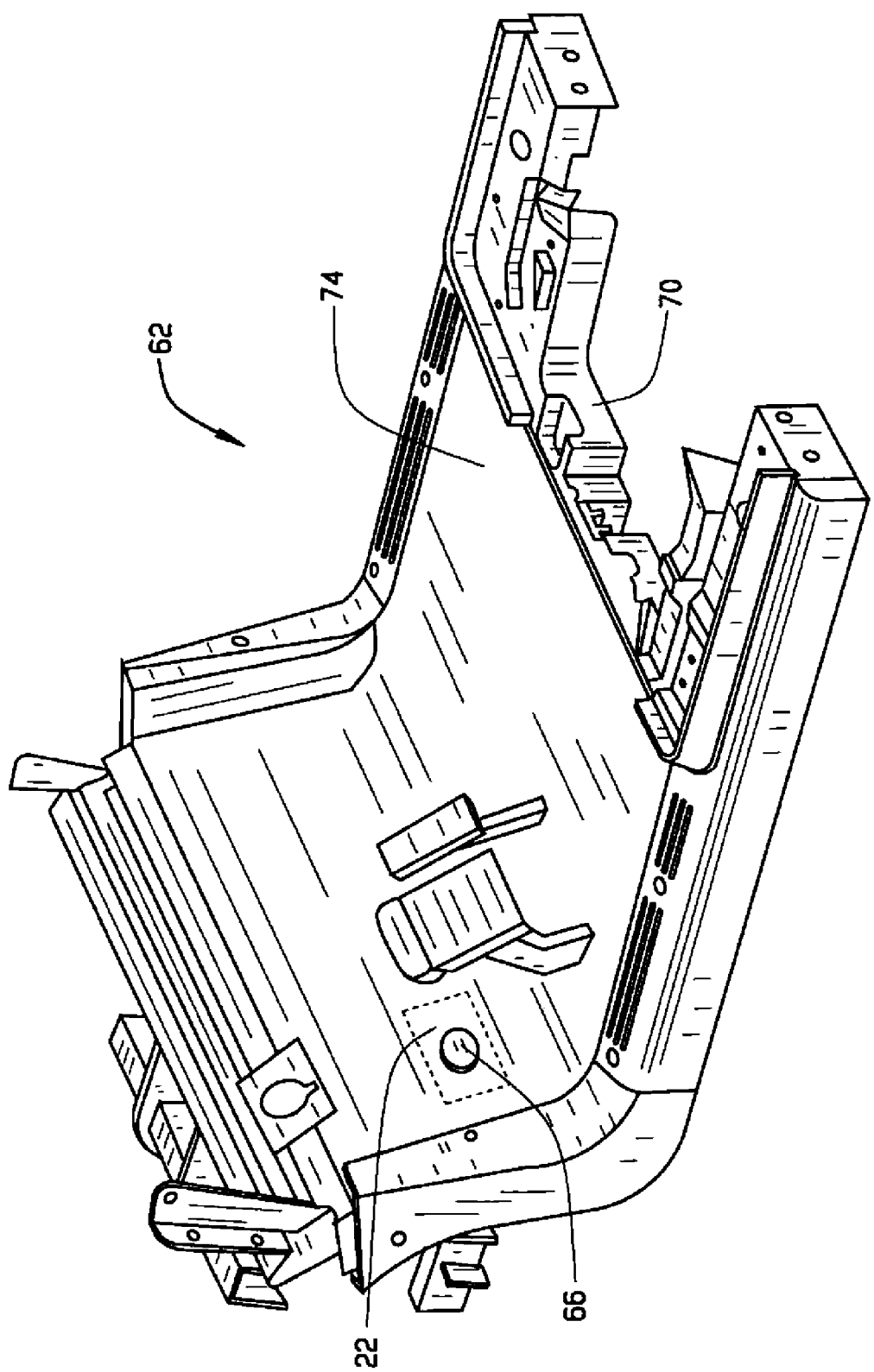
FIG. 3 is an isometric view of a floor assembly of the vehicle including a pressure sensitive horn switch of the horn activation system shown in FIG. 1.
Figure 4:
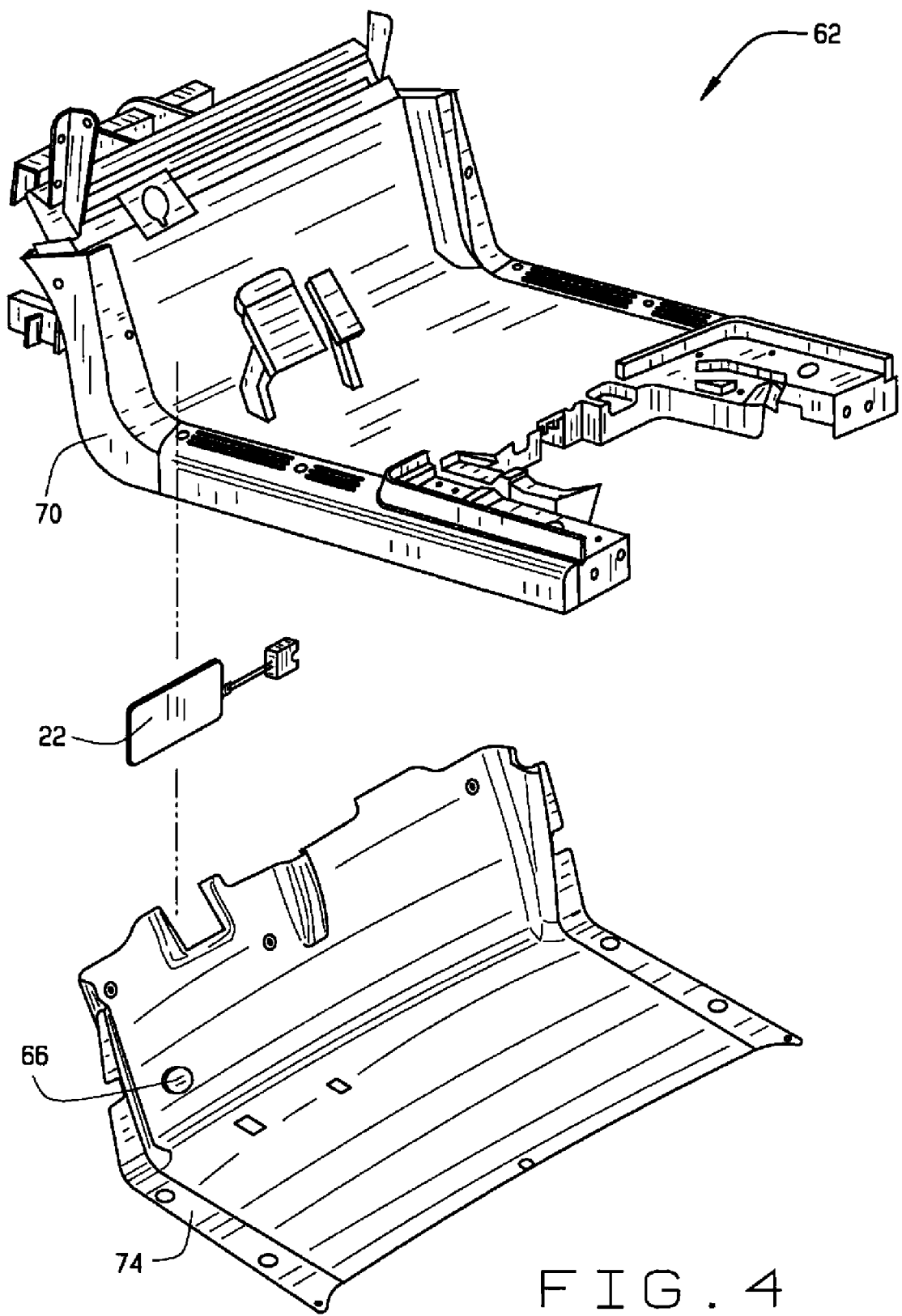
FIG. 4 is an exploded view of the floor assembly shown in FIG. 3, in accordance with various embodiments of the present disclosure.
Figure 5:
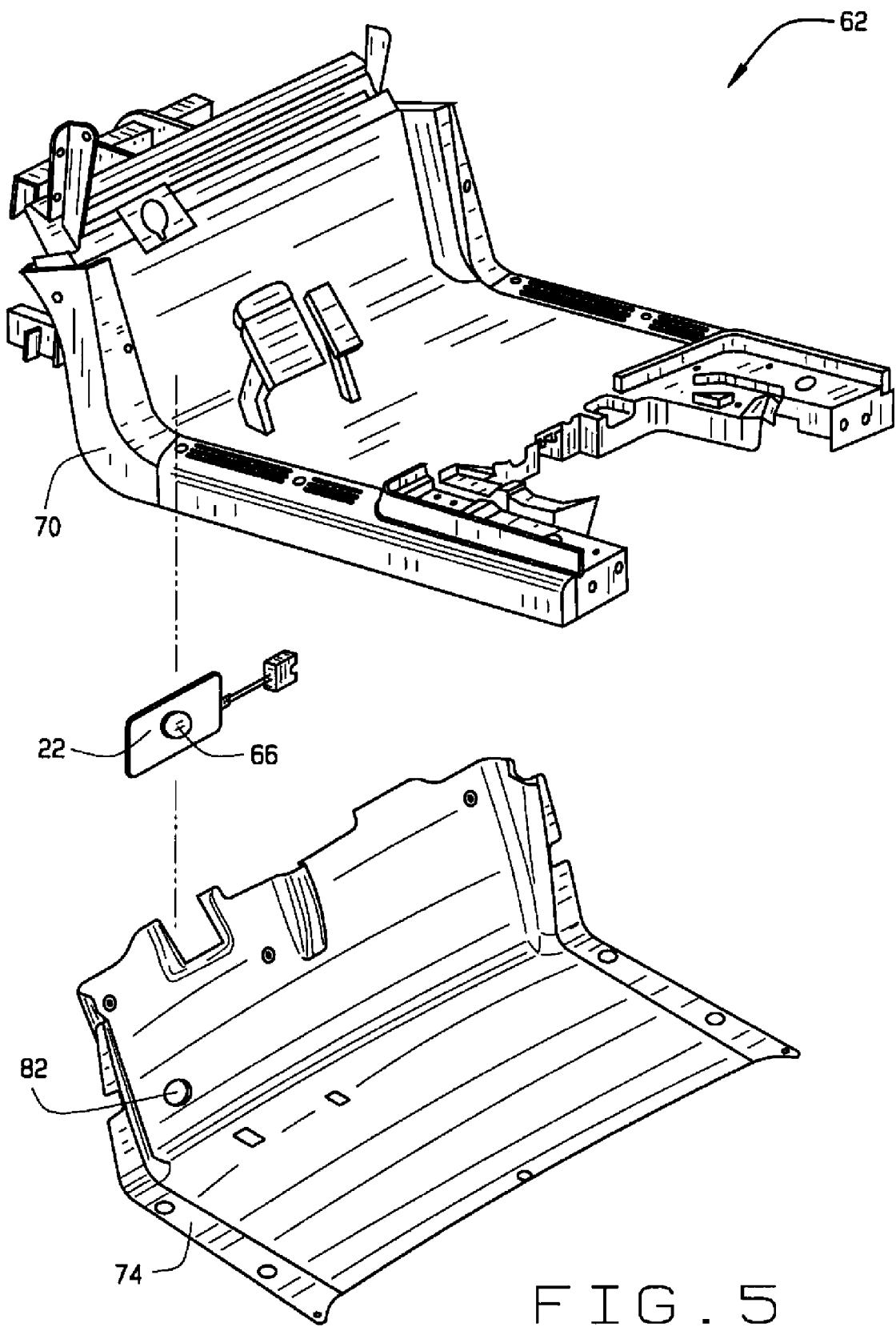
FIG. 5 is an exploded view of the floor assembly shown in FIG. 3, in accordance with various other embodiments of the present disclosure.

Referring to FIGS. 3, 4 and 5, the floor assembly 62 can comprise a floor structure 70 and a floor mat 74 that covers at least a portion of a top surface of the floor structure 70. The horn button 66 can be any biased or non-biased device, apparatus or formation having any suitable shape and size that can be pressed to compress the pressure sensitive horn switch 22 and activate the horn 18, and subsequently released to allow the pressure sensitive switch 22 to decompress and deactivate the horn 18. Operation of the horn button 66, the horn control circuit 26 and the horn 18 is described further below.

Referring particularly to FIG. 4, in various embodiments, the horn button 66 can be a raised node or formation integrally formed into, i.e., molded into, the floor mat 74 or a device or apparatus coupled or affixed, e.g., glued, riveted, screwed or bolted, to the floor mat 74. Generally, the pressure sensitive horn switch 22 is located between the horn button 66 and the floor structure 70. More specifically, in various embodiments, the pressure sensitive horn switch 22 can be integrally formed with, i.e., molded into, the floor mat 74. In various other implementations, the pressure sensitive horn switch 22 can be coupled or affixed, e.g., glued, riveted, screwed or bolted, to a back side of the floor mat 74 or a top side of the floor structure 70. In still other embodiments, the pressure sensitive horn switch 22 can be integrally formed with, i.e., molded into, the horn button 66 that is integrally formed with or connected to the floor mat 74. Locating the pressure sensitive horn switch 22 between the horn button 66 and the floor structure 70 conceals the pressure sensitive horn switch 22 from view. Additionally, by locating the pressure sensitive switch 22 between the horn button 66 and the floor structure 70 the floor mat 74 protects the pressure sensitive horn switch 22 from exposure to water, debris and other contaminates that could harm the pressure sensitive horn switch 22.

Referring particularly to FIG. 5, in various embodiments, the horn button 66 can be a raised node or formation integrally formed with, i.e., molded into, the pressure sensitive switch 22 that extends through an aperture 82 in the floor mat 74. Or, the horn button 66 can be a device or apparatus coupled or affixed, e.g., glued, riveted, screwed or bolted, to the pressure sensitive switch 22 that extends through the aperture 82 in the floor mat 74.

Referring again to FIG. 2, as described above, in various exemplary embodiments, the pressure sensitive horn switch 22 is compressed, i.e., closed, by pressing the horn button 66. Upon closure, the pressure sensitive horn switch 22 outputs a horn activation signal 78, e.g., a voltage output, to the electronic switching device 58 that drives or activates the electronic switching device 58 to allow a current flow through horn control circuit 26. Accordingly, the current flows through the horn 18 activating the horn 18, i.e., causing the horn to produce an audible noise, sound or sequence of sounds.

The electronic switching device 58 can be any electronic switching device suitable for receiving the horn activation signal 78 and controlling the flow of current through the horn control circuit 26. For example, the electronic switching device 66 can be a magnetic relay switch or a solid state transistor. In various implementations, the electronic switching device 58 is normally open such that current does not flow through the horn control circuit 26 and the horn is not activated, i.e., not producing sound. When the electronic switching device 58 receives the horn activation signal 78 from the pressure sensitive horn switch 22, the electronic switching device 58 closes to complete, or close, the horn control circuit 26. Closing the horn control circuit 26 electrically connects the power source 54 to the horn 18 such that current flows through the horn control circuit 26 activating the horn 18.

Conversely, when the horn button 66 is released, or not depressed, the pressure sensitive horn switch 22 is not compressed and terminates, or does not transmit, the horn activation signal 78. In response to the termination or absence of the horn activation signal 78, the electronic switching device 58 opens, breaking the horn control circuit 26, and terminating or preventing current flow through the horn control circuit 26 such that the horn 18 is not activated. Thus, the horn 18 is only activated, i.e., producing sound, when pressure is applied to the horn button 66, for example, pressure applied by a vehicle operator stepping on the horn button 66.

The pressure sensitive horn switch 22 can be any suitable pressure sensitive switch that operates to output the horn activation signal 78 to the electronic switching device 58 when pressure is applied to the horn button 66 to compress the pressure sensitive horn switch 22. For example, the pressure sensitive horn switch 22 can be a non-contact pressure sensitive switch, a membrane switch, a tape switch, a conductive elastomer type switch or a variable resistance material type switch.

Thus, the horn activation system 14, as described herein, provides a horn activation system that is easy to implement, cost efficient and locates the pressure sensitive horn switch 22 such that it is safe from exposure to water, rocks, dirt and other contaminates that can damage and/or destroy the pressure sensitive horn switch.

While the present teachings are described in conjunction with various embodiments, it is not intended that the present teachings be limited to such embodiments. On the contrary, the present teachings encompass various alternatives, modifications, and equivalents, as will be appreciated by those skilled in the art. The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A horn activation system for a lightweight utility vehicle, said system comprising:
   a pressure sensitive horn switch (PSHS) operably connected to a horn button;
   an electronic switching device communicatively connected directly with the PSHS to receive a horn activation signal transmitted directly from the PSHS when the PSHS is compressed to thereby transition the switching device from an open state to a closed state; and
   a horn configured to receive a current flow resulting from the electronic switching device closing a horn control circuit upon receipt of the horn activation signal.

2. The system of claim 1, wherein the horn button comprises a raised formation integrally formed with a vehicle floor mat.

3. The system of claim 1, wherein the horn button comprises a raised formation molded into a vehicle floor mat.

4. The system of claim 1, wherein the horn button comprises a raised formation affixed to a vehicle floor mat.

5. The system of claim 1, wherein the horn button comprises a raised formation integrally formed with the PSHS and extending through an aperture in the floor mat.

6. The system of claim 1, wherein the horn button comprises a raised formation affixed to the PSHS and extending through an aperture in the floor mat.

7. The system of claim 1, wherein the PSHS comprises one of a non-contact pressure sensitive switch, a membrane switch, a tape switch, a conductive elastomer type switch or a variable resistance material type switch.

8. The system of claim 1, wherein the horn control circuit comprises the electronic switching device, a power source and the horn, wherein the electronic switching device completes the horn control circuit upon receipt of the horn activation signal connecting the power source across the horn and causing the current flow through the horn control circuit activating the horn.

9. The system of claim 1, wherein the electronic switching device opens the horn control circuit when not receiving the horn activation signal so that current does not flow through the horn control circuit and a horn is not activated.

10. A method for activating a lightweight utility vehicle horn, said method comprising:
    transmitting a horn activation signal directly from a pressure sensitive horn switch (PSHS) to an electronic switching device when a horn button operably connected to the PSHS is pressed to compress the PSHS; and
    transitioning the electronic switching device from an open state to a closed state in response to horn activation signal to close a horn control circuit and provide current to a vehicle horn for activating the horn.

11. The method of claim 10, wherein transmitting the horn activation signal comprises positioning the PSHS between a vehicle floor structure and a floor mat covering at least a portion of a top surface of the vehicle floor structure.

12. The method of claim 10, wherein the method further comprises terminating transmission of the horn activation signal when the PSBLS is in a non-compressed state.

13. The method of claim 12, wherein the method further comprises opening the electronic switching device when transmission of the horn activation signal is terminated to open the horn control circuit such that current flows through the horn control circuit is terminated.

14. A lightweight utility vehicle comprising:
a horn activation system, said horn activation system comprising:
   a pressure sensitive horn switch (PSHS) operably connected to a horn button such that depression of a horn button compresses the PSHS; and
   a horn control circuit comprising:
      a vehicle horn; and
      an electronic switching device communicatively connected directly with the PSHS to receive a horn activation signal transmitted directly from the PSHS when the PSHS is compressed to thereby transition the switching device from and open state to a closed state and enable a current flow through the horn.

15. The vehicle of claim 14, wherein the horn button comprises a raised formation integrally formed with a vehicle floor mat.

16. The vehicle of claim 14, wherein the horn button comprises a raised formation molded into a vehicle floor mat.

17. The vehicle of claim 14, wherein the horn button comprises a raised formation affixed to a vehicle floor mat.

18. The vehicle of claim 14, wherein the horn button comprises a raised formation integrally formed with the PSHS and extending through an aperture in the floor mat.

19. The vehicle of claim 14, wherein the horn button comprises a raised formation affixed to the PSHS and extending through an aperture in the floor mat.

20. The vehicle of claim 14, wherein the PSHS comprises one of a non-contact pressure sensitive switch, a membrane switch, a tape switch, a conductive elastomer type switch or a variable resistance material type switch.

21. The vehicle of claim 14, wherein the horn control circuit further comprises a power source, wherein the electronic switching device completes the horn control circuit upon receipt of the horn activation signal connecting the power source across the horn and causing the current flow through the horn control circuit activating the horn.

22. The vehicle of claim 14, wherein the electronic switching device opens the horn control circuit when not receiving the horn activation signal so that current does not flow through the horn control circuit and a horn is not activated.

* * * * *